US011488376B2

(12) United States Patent
Fu et al.

(10) Patent No.: US 11,488,376 B2
(45) Date of Patent: Nov. 1, 2022

(54) HUMAN SKIN DETECTION BASED ON HUMAN-BODY PRIOR

(71) Applicant: SONY GROUP CORPORATION, Tokyo (JP)

(72) Inventors: Chen Fu, San Jose, CA (US); Mohammad Gharavi Alkhansari, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/175,979

(22) Filed: Feb. 15, 2021

(65) Prior Publication Data
US 2022/0269897 A1  Aug. 25, 2022

(51) Int. Cl.
| | |
|---|---|
| *G06V 10/56* | (2022.01) |
| *G06T 7/50* | (2017.01) |
| *G06T 7/73* | (2017.01) |
| *G06K 9/62* | (2022.01) |
| *G06V 10/75* | (2022.01) |

(Continued)

(52) U.S. Cl.
CPC ........... *G06V 10/56* (2022.01); *G06K 9/6277* (2013.01); *G06K 9/6279* (2013.01); *G06T 7/50* (2017.01); *G06T 7/74* (2017.01); *G06T 7/75* (2017.01); *G06V 10/758* (2022.01); *G06V 20/64* (2022.01); *G06V 40/10* (2022.01);
(Continued)

(58) Field of Classification Search
CPC . G06V 10/56; G06T 7/74; G06T 2207/30196; G06K 9/6277
See application file for complete search history.

(56) References Cited

U.S. PATENT DOCUMENTS

| | | | |
|---|---|---|---|
| 10,491,895 B2 | 11/2019 | Socek et al. | |
| 2015/0243049 A1* | 8/2015 | Li | G06K 9/6267 382/165 |

FOREIGN PATENT DOCUMENTS

| | | | | |
|---|---|---|---|---|
| CN | 106909884 | * | 6/2017 | ........... G06V 40/113 |
| CN | 106909884 A | | 6/2017 | |

(Continued)

OTHER PUBLICATIONS

Mahmoodi, et al., "A Comprehensive Survey on Human Skin Detection", International Journal of Image, Graphics and Signal Processing, vol. 8, No. 5, May 2016, 35 pages.
(Continued)

*Primary Examiner* — Myron Wyche
(74) *Attorney, Agent, or Firm* — Chip Law Group

(57) ABSTRACT

An electronic device and method for human skin detection based on a human body-prior is provided. A color image of a person is acquired, and a 3D body model of the person is estimated based on the color image. One or more unclothed parts of the 3D body model are identified. The one or more unclothed parts correspond to one or more body parts, of which at least a portion of skin remains uncovered by clothes. From the color image, pixel information corresponding to the one or more unclothed parts is extracted and classification information is determined based on the pixel information. The classification information includes a set of values, each indicating a likelihood of whether a corresponding pixel of the color image is part of an unclothed
(Continued)

skin portion of the person. The unclothed skin portion is detected in the color image based on the classification information.

19 Claims, 6 Drawing Sheets

(51) Int. Cl.
    *G06V 20/64*     (2022.01)
    *G06V 40/10*     (2022.01)

(52) U.S. Cl.
    CPC .................. *G06T 2200/24* (2013.01); *G06T 2207/10024* (2013.01); *G06T 2207/30196* (2013.01)

(56) References Cited

FOREIGN PATENT DOCUMENTS

| CN | 109636831 | * | 4/2019 | ... G06T 2207/30196 |
|---|---|---|---|---|
| CN | 109636831 A | | 4/2019 | |

OTHER PUBLICATIONS

Cao, et al., "Realtime Multi-Person 2D Pose Estimation using Part Affinity Fields", Computer Vision and Pattern Recognition, Apr. 14, 2017, 09 pages.

Pishchulin, et al., "DeepCut: Joint Subset Partition and Labeling for Multi Person Pose Estimation", Conference on Computer Vision and Pattern Recognition, Apr. 26, 2016, 09 pages.

Bogo, et al., "Keep It SMPL: Automatic Estimation of 3D Human Pose and Shape from a Single Image", European Conference on Computer Vision, Oct. 2016, pp. 561-578.

Anguelov, et al., "SCAPE: shape completion and animation of people", ACM Transactions on Graphics, vol. 24, No. 3, Jul. 2005, pp. 408-416.

Loper, et al., "SMPL: A skinned multi-person linear model", ACM Transactions on Graphics, vol. 34, No. 6, Oct. 2015, 16 pages.

Bianco Simone et al: "Adaptive Skin Classification Using Face and Body Detection", IEEE Transactions on Image Processing, IEEE, USA, vol. 24, No. 12, Dec. 1, 2015 (Dec. 1, 2015), pp. 4756-4765, XP011669610, ISSN: 1057-7149, DOI: 10.1109/TIP.2015.2467209 [retrieved on Sep. 17, 2015] the whole document.

* cited by examiner

HUMAN SKIN DETECTION BASED ON HUMAN-BODY PRIOR

CROSS-REFERENCE TO RELATED APPLICATIONS/INCORPORATION BY REFERENCE

None.

FIELD

Various embodiments of the disclosure relate to human skin detection. More specifically, various embodiments of the disclosure relate to an electronic device and method for human skin detection based on a human-body prior.

BACKGROUND

Advancements in image processing have led to development of techniques for detection of skin in an image of a person. Skin detection has applications in a wide number of application areas, such as video surveillance, face recognition, gesture recognition, human-computer interaction, and anti-accident systems. Typically, image-based skin detection techniques segment an image into skin regions and non-skin regions based on a prior knowledge of human skin colors. However, the detection accuracy of such techniques may be limited due to variations which exists in human skin colors and a possibility of presence of objects (in background or foreground) that may have colors which closely resemble or match skin colors or skin textures.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for human skin detection based on a human-body prior is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for human skin detection based on a human-body prior. Exemplary aspects of the disclosure may include the electronic device that may be communicatively coupled to a sensing device. The sensing device may include, for example, an image sensor to capture a color image of a person. The electronic device may acquire the color image from the image sensor and may estimate a three-dimensional (3D) body model of the person based on the acquired color image. The sensing device may further include a depth sensor. The depth sensor may capture depth information associated with the body of the person. The electronic device may further acquire the depth information associated with the body of the person. The estimation of the 3D body model may be further based on the acquired depth information.

The electronic device may identify one or more unclothed parts of the estimated 3D human body model. The identified one or more unclothed parts may correspond to one or more body parts, of which at least a portion of skin may remain uncovered by clothes. For example, the identification of the unclothed parts may be based on a user-input and may include an assignment of an identifier to each of the one or more unclothed parts. Such unclothed parts may include, for example, a head portion, a neck portion, a hand portion, a leg portion, and the like.

The electronic device may extract pixel information from the acquired color image based on the estimated 3D body model. The pixel information may correspond to the identified one or more unclothed parts. Based on the extracted pixel information, the electronic device may determine classification information. The classification information may include a set of values, each of which may indicate a likelihood of whether or not a corresponding pixel of the acquired color image may be part of an unclothed skin portion of the person. Thereafter, the electronic device may detect the unclothed skin portion in the acquired color image based on the determined classification information.

The detection of unclothed skin portion based on human-body prior may be more accurate as compared to conventional methods, such as, techniques that may involve a use of a prior knowledge of human skin colors. This may be because the disclosed technique may use the body prior for skin portion detection and as a result may not be affected by large variation of human skin colors, as in the case of conventional methods. Further, the detection of unclothed skin portion based on identification of human body parts may be less prone to false detections, such as a false detection of objects which may match or be close to a skin color.

Figure 1:
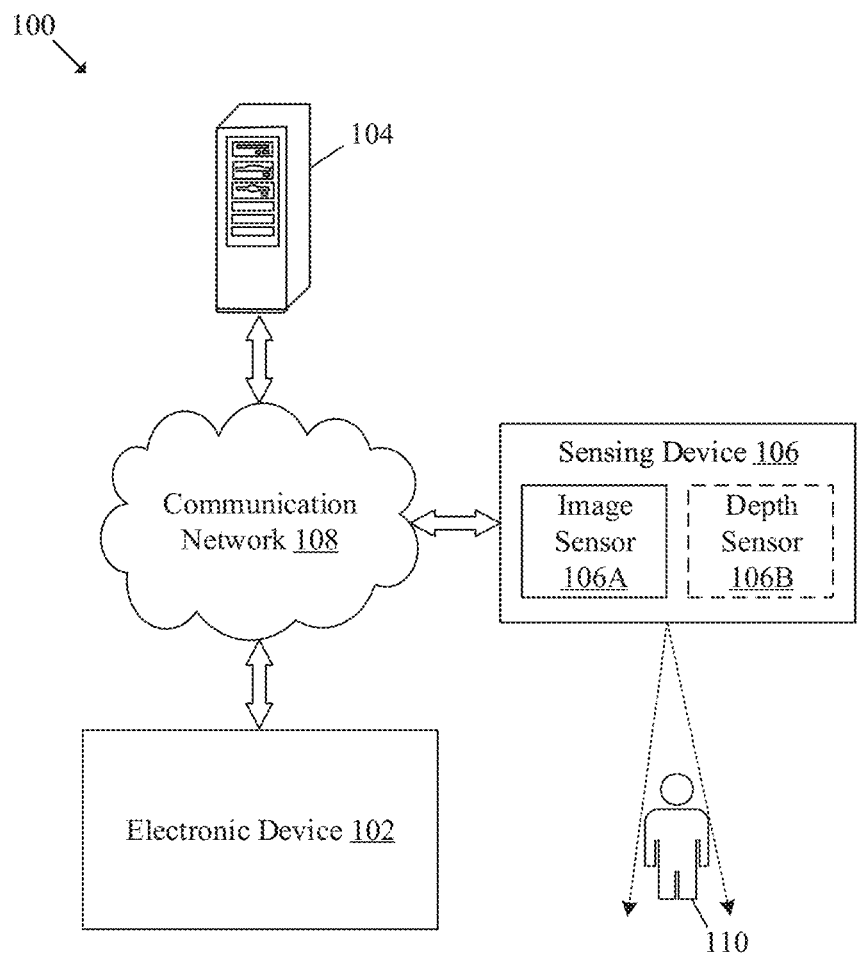
FIG. 1 is a block diagram that illustrates an exemplary network environment for human skin detection based on a human body-prior, in accordance with an embodiment of the disclosure.

FIG. 1 is a block diagram that illustrates an exemplary network environment for human skin detection based on a human-body prior, in accordance with an embodiment of the disclosure. With reference to FIG. 1, there is shown a network environment 100. The network environment 100 may include an electronic device 102, a server 104, a sensing device 106, and a communication network 108. There is further shown a person 110 who may be associated with the electronic device 102. The sensing device 106 may include an image sensor 106A and a depth sensor 106B. The electronic device 102 may be communicatively coupled to the server 104 and the sensing device 106, via the communication network 108. In FIG. 1, the server 104 and the sensing device 106 are shown as two entities which are separate from the electronic device 102. In some embodiments, some or all of the functionalities of the server 104 and/or the sensing device 106 may be incorporated in the electronic device 102, without departing from the scope of the present disclosure.

The electronic device 102 may include suitable logic, circuitry, interfaces, and/or code that may be configured to detect an unclothed skin portion in one or more color images of the person 110. The unclothed skin portion may correspond to skin pixels which may be exposed in the color image. The unclothed skin portion may vary depending on the type of clothes that the person 110 may wear. Examples of the electronic device 102 may include, but are not limited to, a computing device, a video-conferencing system, an augmented reality-based device, a gaming device, a mainframe machine, a server, a computer work-station, and/or a consumer electronic (CE) device.

The server 104 may include suitable circuitry, interfaces, and/or code that may be configured to store a three-dimensional (3D) human-body prior. Examples of the server 104 may include, but are not limited to, an application server, a cloud server, a web server, a database server, a file server, a gaming server, a mainframe server, or a combination thereof.

The sensing device 106 may include suitable logic, circuitry, interfaces, and/or code that may be configured to capture a color image and corresponding depth information of a body of the person 110. The sensing device 106 may be configured to transmit the captured color image and the corresponding depth information to the electronic device 102, via the communication network 108. The sensing device 106 may include a plurality of sensors, such as a combination of a depth sensor, a color sensor, (such as a red-green-blue (RGB) sensor), and/or an infrared (IR) sensor which may capture the face of the user from a particular viewing angle. Example implementations of the sensing device 106 may include, but are not limited to, a depth sensor, a Light Detection and Ranging (LiDAR), a Time-of-Flight (ToF) sensor, a sensor which implements Structure-from-motion (SfM), an IR sensor, an image sensor, a structured-light 3D scanner, a hand-held laser scanner, a modulated light 3D scanner, a stereoscopic camera, a camera array, and/or a combination thereof. In one embodiment, the sensing device 106 may be implemented as a component of the electronic device 102.

The image sensor 106A may include suitable logic, circuitry, and interfaces that may be configured to capture the color image of the body of the person 110. Examples of the image sensor 106A may include, but are not limited to, an image sensor, a wide-angle camera, an action camera, a closed-circuit television (CCTV) camera, a camcorder, a digital camera, camera phones, a night-vision camera, and/or other image capture devices.

The depth sensor 106B may include suitable logic, circuitry, and interfaces that may be configured to capture the depth information of the body of the person 110. The depth information may or may not match a viewpoint from where the color image of the body is captured. Examples of the depth sensor 106B may include, but are not limited to, a stereo camera-based sensor, a ToF depth sensor, a Light Detection And Ranging (LiDAR)-based depth sensor, a Radio Detection And Ranging (RADAR)-based depth sensor, an ultrasonic depth sensor, and/or other depth/proximity sensors.

The communication network 108 may include a communication medium through which the electronic device 102 may be communicatively coupled to the server 104 and the sensing device 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, $4^{th}$ Generation or $5^{th}$ Generation (5G) mobile network (i.e. 5G New Radio)). Various devices of the network environment 100 may be configured to connect to the communication network 108, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the sensing device 106 may be configured to capture a color image and corresponding depth information of a body of the person 110 from a particular viewpoint (such as a front view of a body). For example, the image sensor 106A may capture an RGB color image of the body of the person 110 and the depth sensor 106B may capture the depth information corresponding to the RGB color image of the body. Together, the sensing device 106 may capture RGB-Depth (RGBD) data of the body of the person 110.

The sensing device 106 may be configured to transmit the captured color image and the depth information to the electronic device 102. In an embodiment, the electronic device 102 may acquire the color image of the face of the person 110 and the depth information corresponding to the color image of the face of the person 110 from the sensing device 106. The electronic device 102 may be configured to estimate a 3D body model of the person 110 based on the acquired color image. In an embodiment, the estimation of the 3D body model may be further based on the acquired depth information. In the estimation of the 3D body model, the pose of the person in the color image may be detected and imposed on the 3D body model. After the estimation is done, the estimated 3D body model may be referred to as a posed 3D model of the person. Details of the estimation of the 3D body model are provided, for example, in FIG. 3 and FIG. 4.

The electronic device 102 may be configured to identify one or more unclothed parts of the estimated 3D body model. The identified one or more unclothed parts may correspond to one or more body parts, of which at least a portion of skin may remain uncovered by clothes. By way of example, and not limitation, the identification may include an assignment of an identifier or a label to each of the one or more unclothed parts. An example of an identifier may include a label for a part of the 3D body model, such as a face, a neck, or hands where the skin is likely to be exposed with higher probability (i.e. above a threshold).

The electronic device 102 may be configured to extract pixel information from the acquired color image based on the estimated 3D body model. The pixel information may correspond to the identified one or more unclothed parts of the estimated 3D body model. In an embodiment, before the extraction, the 3D body model (i.e. a posed model) may be projected onto a 2D image plane and points corresponding to the identified one or more parts (such as face, neck, and hands) in the projection may be mapped to pixels in the color image. Thereafter, the pixel information associated with such pixels (which map to the points in the projection) may be extracted. The extracted pixel information may include, for example, a location and a color value (such as RGB values) of each of such pixels of the acquired color image.

In many cases, the pixel information may not be associated with all skin pixels of the color image. For example, it is possible that if the person 110 wears shorts and if only face and hands are identified as unclothed part(s), then the pixel information may be associated with pixels which belong to only the face and the hands. The pixel information may not be associated with any other unclothed part, which may still be exposed in the color image. For example, skin on thighs and arms may also be exposed if the person 110 is wearing shorts. In order to detect all unclothed skin portions in the color image, a probability approach may be used, as briefly described herein. Details of the probabilistic approach are provided, for example, in FIG. 3 and FIG. 5.

The electronic device 102 may be configured to determine classification information based on the extracted pixel information. The classification information may include a set of values, each of which may indicate a likelihood of whether or not a corresponding pixel of the acquired color image may be a part of an unclothed skin portion of the person 110. The electronic device 102 may be further configured to detect the unclothed skin portion in the acquired color image based on the determined classification information. The detection of the unclothed skin portion is explained, for example, in FIG. 3.

Figure 2:
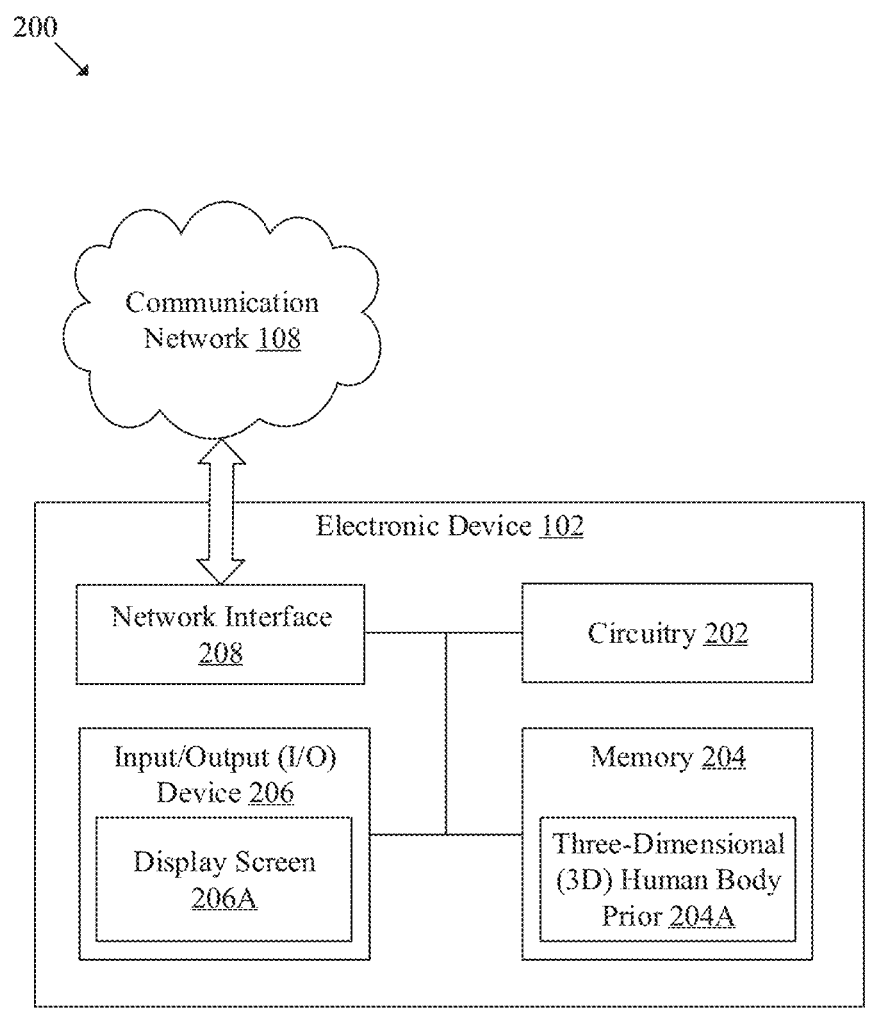
FIG. 2 is a block diagram that illustrates an exemplary electronic device for human skin detection based on a human body-prior, in accordance with an embodiment of the disclosure, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The memory 204 may store a three-dimensional (3D) human-body prior 204A. The I/O device 206 may include a display screen 206A. The circuitry 202 may be communicatively coupled to the memory 204, the I/O device 206, and the network interface 208. The circuitry 202 may be configured to communicate with the server 104 and the sensing device 106, by use of the network interface 208.

The circuitry 202 may include suitable logic, circuitry, and interfaces that may be configured to execute program instructions associated with different operations to be executed by the electronic device 102. The circuitry 202 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

The memory 204 may include suitable logic, circuitry, and/or interfaces that may be configured to store a set of instructions executable by the circuitry 202. The memory 204 may be configured to store operating systems and associated applications. In accordance with an embodiment, the memory 204 may be also configured to store the 3D human-body prior 204A. In addition, the memory 204 may also store the acquired color image, the acquired depth information, the estimated 3D body model. Further, the memory 204 may store the extracted pixel information and the determined classification information. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input from a user, e.g., the person 110. The I/O device 206 may be further configured to provide an output to the user, e.g., the person 110. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display screen 206A and/or a speaker.

The display screen 206A may include suitable logic, circuitry, interfaces, and/or code that may be configured to render an application interface to display the detected unclothed skin portion in the acquired color image. In accordance with an embodiment, the display screen 206A may be a touch screen, where input from the person 110 may be received via the application interface. The display screen 206A may capture the input based on an input received from the user, e.g., the person 110. The user may be able to provide inputs with the help of a plurality of buttons or UI elements displayed on the touch screen. The touch screen may correspond to at least one of a resistive touch screen, a capacitive touch screen, or a thermal touch screen. In accordance with an embodiment, the display screen 206A may receive the input through a virtual keypad, a stylus, a gesture-based input, and/or a touch-based input. The display screen 206A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 206A may refer to a display screen of smart-glass device, a see-through display, a projection-based display, an electro-chromic display, and/or a transparent display.

The network interface 208 may include suitable logic, circuitry, code, and/or interfaces that may be configured to facilitate communication between the circuitry 202, the server 104, and the sensing device 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a 5th generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 208 may be capable to communicate with a 5G communication network and will include appropriate 5G support functionality such as, but not limited to, a 5G NR, a V2X Infrastructure, and a 5G Smart Antenna. Various operations of the circuitry 202 for the human skin detection based on the human-body prior are described further, for example, in FIGS. 3, 4, and 5.

Figure 3:
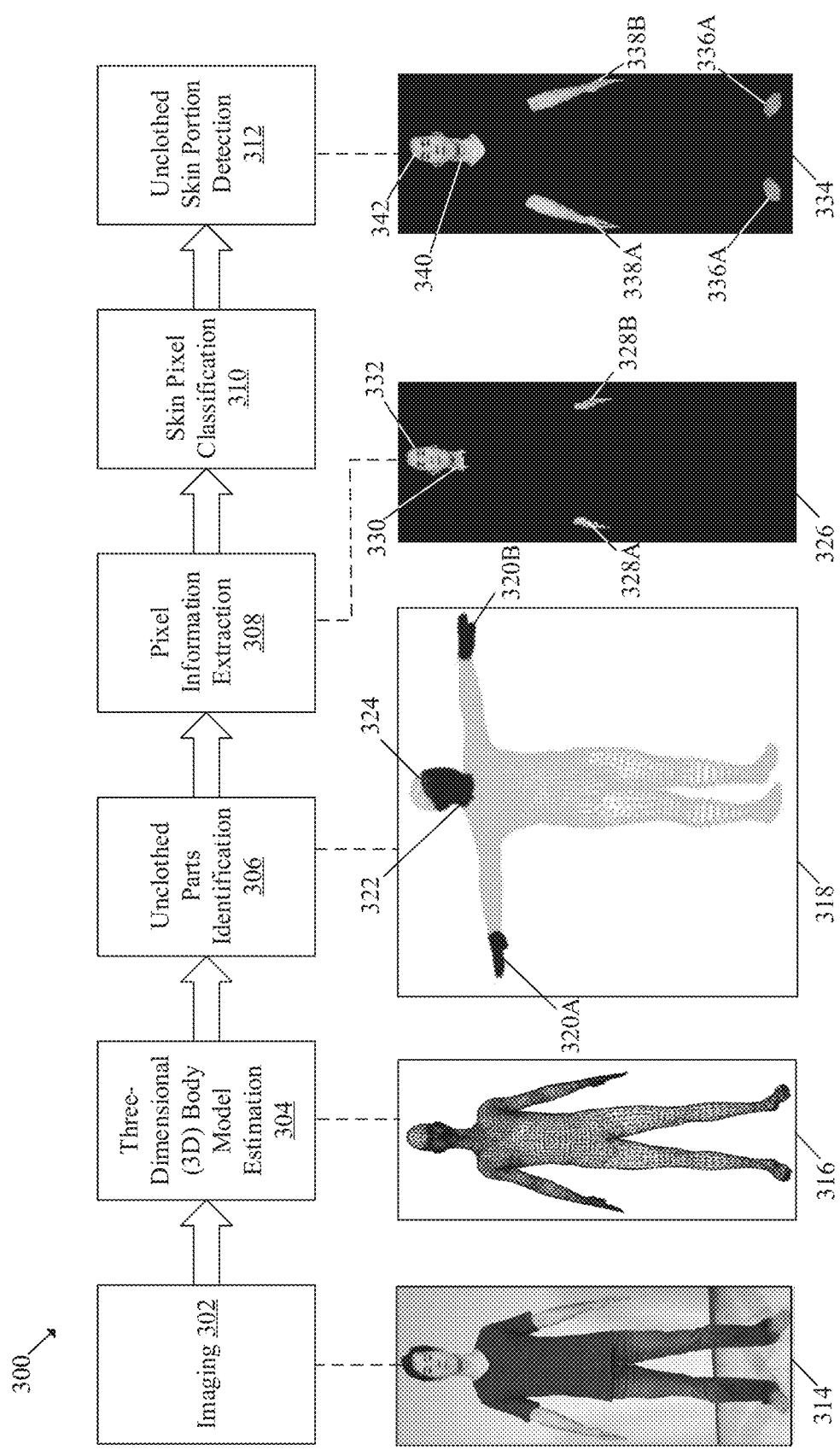
FIG. 3 is a diagram that illustrates the exemplary processing pipeline for human skin detection based on a human body-prior, in accordance with an embodiment of the disclosure.

FIG. 3 is a diagram that illustrates an exemplary processing pipeline for human skin detection based on a human-body prior, in accordance with an embodiment of the disclosure. FIG. 3 is explained in conjunction with elements from FIG. 1 and FIG. 2. With reference to FIG. 3, there is shown a processing pipeline 300 of operations from 302 to 312 to depict human skin detection based on a human-body prior.

At 302, a body of the person 110 may be imaged. In an embodiment, the sensing device 106 may be configured to image the body of the person 110. With the imaging, the image sensor 106A of the sensing device 106 may capture a color image 314 of the body of the person 110. The sensing device 106 may be configured to transmit the color image 314 to the electronic device 102 via an I/O interface or via the communication network 108. Alternatively, the circuitry 202 may acquire the color image 314 from the sensing device 106. For example, in a scenario where the sensing device 106 is implemented as a component of the electronic device 102, the circuitry 202 of the electronic device 102 may acquire the color image 314 from the sensing device 106.

At 304, a three-dimensional (3D) body model 316 may be estimated. In an embodiment, the circuitry 202 may be configured to estimate the 3D body model 316 of the person 110, based on the acquired color image 314. Before the estimation is done, the circuitry 202 may be configured to determine a two-dimensional (2D) pose of the body of the person 110 based on the acquired color image 314. The 2D pose may include human joints locations and orientations associated with the body. After the 2D pose is determined, the circuitry 202 may be configured to determine a 3D pose and shape of the body based on the determined 2D pose and the 3D human-body prior 204A. By way of example, and not limitation, the 3D human-body prior 204A may be one of a Shape Completion and Animation of People (SCAPE) model or a Skinned Multi-Person Linear (SMPL) model.

In an embodiment, the 3D body model 316 may be estimated based on the determined 3D pose and the 3D human-body prior 204A. For instance, the 3D human-body prior 204A may be morphed to fit the determined 3D pose and shape of the body of the person in the acquired color image 314. The estimation of the 3D model is described further, for example, in FIG. 4.

At 306, one or more unclothed parts of the estimated 3D body model 316 may be identified. In an embodiment, the circuitry 202 may be configured to identify the one or more unclothed parts of the estimated 3D body model 316. The identified one or more unclothed parts may correspond to one or more body parts, of which at least a portion of skin may remain uncovered by clothes. Such unclothed part(s) in the estimated 3D body model 316 may be considered as body parts, such as face, hands, neck, or feet where the skin may remain exposed or uncovered by the clothes with a high probability (above a threshold). For example, if a person is wearing a t-shirt and jeans, then the skin from the face portion, the hand portion, and the neck portion may remain exposed or uncovered with a high probability. Other examples of the identified one or more unclothed parts may include, but are not limited to, a head portion, a leg portion, or arm portion. An example of a labelled 3D body model 318 includes identified unclothed parts, such as a first hand portion 320A, a second hand portion 320B, a neck portion 322, and a head portion 324.

In an embodiment, the circuitry 202 may be configured to receive a user input from a user who may be associated with the electronic device 102. The user input may include, for example, a selection of one or more body parts, such as face, hands, or feet where the skin may be most likely to be exposed. For example, in many clothes, the hand, face, and feet skin likely remains exposed or uncovered by the clothes. The unclothed part(s) may be identified based on the received user input.

In an embodiment, the identification may include assignment of an identifier to each of one or more unclothed parts. For example, the identifier may be a label, such as head, face, left hand, right hand, feet, or neck. Such labels may be specified in a user input. In another embodiment, the 3D human-body prior 204A may include information, such as a set of identifiers associated with one or more parts of a human body. The circuitry 202 may assign an identifier to each of one or more unclothed parts based on selection of corresponding one or more identifiers from the set of identifiers associated with the 3D human-body prior 204A.

In an embodiment, the circuitry 202 may be configured to determine a first part of the estimated 3D body model 316 which may be clothed. The determination of the first part may be based on a color distribution of pixels, included in the acquired color image 314 and correspond to the first part of the estimated 3D body model 316. For example, based on a comparison of the color distribution of the pixels with a set of preset color distributions associated with clothes, the circuitry 202 may identify the first part as a clothed region in the acquired color image 314. In an embodiment, the circuitry 202 may be configured to identify the one or more unclothed parts in the estimated 3D body model 316, further based on the determination of the first part.

In an embodiment, the circuitry 202 may determine all labelled parts of the estimated 3D body model 316, based on the 3D human-body prior 204A. To identify or label the unclothed part(s), the circuitry 202 may exclude, from all the labelled or preset parts, one or more parts (such as the first part) which may be determined as clothed. For example, it may be determined that the color distribution of pixels on the hands largely differ from the color distribution of pixels on the face and the neck. In such a case, the hands may be determined to be hidden or covered in clothes or any wearable, such as gloves or pockets in the clothes. In such a case, the hands may not be included in the identified one or more unclothed parts of the 3D body model 316.

At 308, pixel information 326 may be extracted from the acquired color image 314. In an embodiment, the circuitry 202 may be configured to extract the pixel information 326 from the acquired color image 314, based on the estimated 3D body model (e.g., the 3D body model 316). The extracted pixel information 326 may correspond to the identified one or more unclothed parts (for example, the first hand portion 320A, the second hand portion 320B, the neck portion 322, and the head portion 324).

In an embodiment, before the pixel information 326 is extracted, the circuitry 202 may be configured to project the estimated 3D body model 316 onto a 2D image plane. For example, the projection of the estimated 3D body model 316 may be an orthographic projection, which may be also referred to as a 2D projection of the estimated 3D body model 316. The projection may be based on one or more alignment parameters associated with an imaging device (e.g., the image sensor 106A of the sensing device 106) which captured the color image (e.g., the color image 314). Examples of the one or more alignment parameters associated with the image sensor 106A may include, but are not limited to, a focal length, an aperture, a scale factor, and a lens distortion parameter. In an embodiment, the circuitry 202 may be configured to extract the pixel information 326 based on a correspondence between points belonging to the identified one or more unclothed parts in the projection of the 3D body model 316 and corresponding pixels of the acquired color image 314. By way of example, and not limitation, the pixel information 326 may include a first region 328A associated with the first hand portion 320A, a second region 328B associated with the second hand portion 320B, a third region 330 associated with the neck portion 322, and a fourth region 332 associated with the head portion 324.

At 310, a skin pixel classification operation may be executed. In an embodiment, the circuitry 202 may be configured to execute the skin pixel classification operation to determine classification information based on the extracted pixel information. The classification information may include a set of values. Each of the set of values may indicate a likelihood of whether or not a corresponding pixel of the acquired color image 314 is part of an unclothed skin portion of the person 110.

In an embodiment, as part of the skin pixel classification operation, the circuitry 202 may be configured to fit the extracted pixel information to a Gaussian model. Based on the fitting, the circuitry 202 may estimate a mean and a covariance of pixel values that may be included in the extracted pixel information. In an embodiment, the circuitry 202 may determine the classification information as a probability map, based on the estimation of the mean and the covariance. By way of example, and not limitation, the probability map or the classification information may be determined by use of the following equation (1):

$$P = e^{-\frac{1}{2}(c-\mu_S)^T \Sigma_S (c-\mu_S)} \quad (1)$$

where,
P may represent the probability (i.e. a value of the probability map) of whether a pixel of the acquired color image 314 corresponds to an unclothed skin portion;
$\mu_S$ may represent the mean of the Gaussian model;
$\Sigma_S$ may represent the covariance of the Gaussian model;

(T) may represent a matrix transpose operator; and
c may represent color space features.

The color space features (i.e., "c") may be represented as a vector that may include a Cb (Chroma-blue) color channel, a Cr (Chroma-red) color channel, and a normalized red color channel associated with a pixel of the acquired color image 314. An example of the probability map associated with each pixel of a color image is provided, for example, in FIG. 5.

At 312, an unclothed skin portion may be detected. In an embodiment, the circuitry 202 may be configured to detect the unclothed skin portion in the acquired color image 314 based on the determined classification information. The unclothed skin portion may include all exposed-skin pixels (including but not limited to, a set of skin pixels included in the extracted pixel information) in the acquired color image 314

In an embodiment, the circuitry 202 may be configured to apply a thresholding operation of the determined probability map (as determined at 310) and may detect the unclothed skin portion in the acquired color image 314 based on the application of the thresholding operation. For example, each probability value in the probability map may be compared with a threshold. If a probability value for a pixel in the probability map is below a threshold value, the value of the pixel may be set as zero (0). An example of the detection of the unclothed skin portion is represented as a segmented color image 334. While skin pixels belonging to the detected unclothed skin portion may be included in the segmented color image 334, the non-skin pixels may be set as zero (0). The segmented color image 334 includes, for example, a first foot portion 336A, a second foot portion 336B, a first arm-and-hand portion 338A, a second arm-and-hand portion 338B, a neck portion 340, and a head portion 342 as the detected unclothed skin portion of the acquired color image 314.

Figure 4:
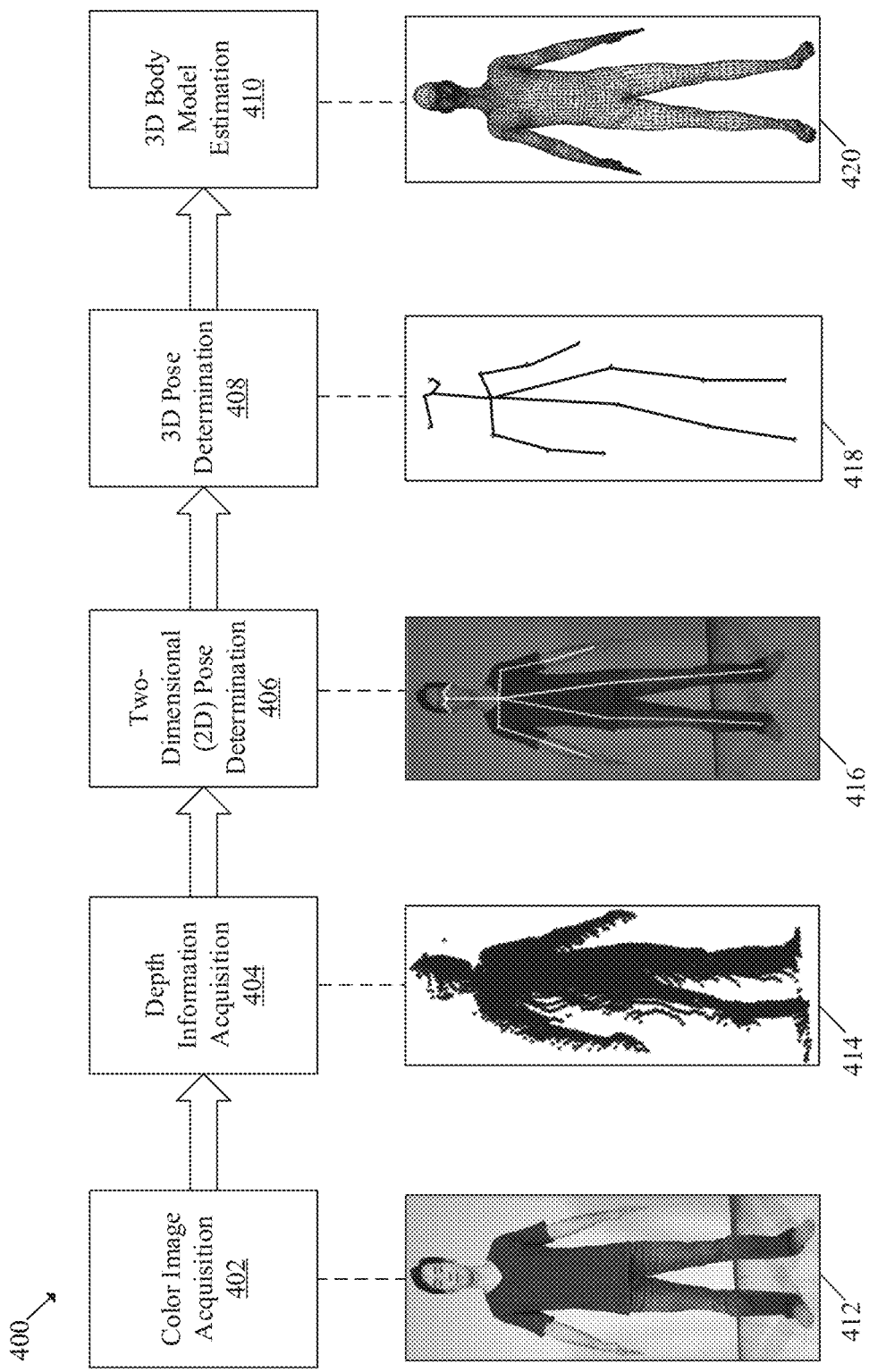
FIG. 4 is a diagram that illustrates an exemplary processing pipeline for estimation of a three-dimensional (3D) body model of a person, in accordance with an embodiment of the disclosure.

FIG. 4 is a diagram that illustrates an exemplary processing pipeline for estimation of a three-dimensional (3D) body model of a person, in accordance with an embodiment of the disclosure. FIG. 4 is described in conjunction with elements from FIGS. 1, 2, and 3. With reference to FIG. 4, there is shown a processing pipeline 400 of operations from 402 to 410 to estimate a 3D body model of a person.

At 402, a color image 412 may be acquired. In an embodiment, the circuitry 202 may be configured to acquire the color image 412 from the sensing device 106. The color image 412 may include a body of the person 110. The sensing device 106 may be configured to transmit the color image 412 to the electronic device 102, via the communication network 108. Alternatively, the circuitry 202 may acquire the color image 412 from the sensing device 106. For example, in a scenario where the sensing device 106 is implemented as a component of the electronic device 102, the circuitry 202 of the electronic device 102 may acquire the color image 412 from the sensing device 106.

At 404, depth information 414 may be acquired. In an embodiment, the circuitry 202 may be configured to acquire the depth information 414 from the sensing device 106. The depth information 414 may be associated with the body of the person 110 and may include a depth image from a specific viewpoint, for example. In an embodiment, the depth sensor 106B of the sensing device 106 may capture the depth information 414 corresponding to the color image 412 of the body of the person 110. For example, the depth information 414 may be represented as a gray scale image, the resolution of which may match the resolution of the color image 412. The captured depth information 414 may include information about "Z" coordinates of the body portions, for example, a protuberance of a nose, a depth of cheek region with respect to a forehead region, a depth of a neck region, a depth of a shoulder region, a depth of an arm and hand region, a depth of stomach region, a depth of a leg region, a depth of a foot region, and depths of other regions of the body.

In an embodiment, the color image 412 and the corresponding depth information 414 may be aligned with each other such that the color image 412 and the corresponding depth information 414 of the body of the person 110 correspond to a common viewpoint (such as a front view of the face). The alignment of the color image 412 and corresponding depth information 414 may be done by use of a suitable alignment method (which may be known to one skilled in the art). While the color image 412 may determine 2D position and texture of points sampled from the body of the person 110, the depth information 414 may add depth or z-values to such points. Having both the depth information 414 and the corresponding color image 412 from a particular viewpoint (such as a common frontal viewpoint) may provide enhanced understanding of the shape, different features, and depth of each region of the body from a three dimensional perspective retaining intricate details of the body of the person 110.

At 406, a two-dimensional (2D) pose may be determined. In an embodiment, the circuitry 202 may be configured to determine the 2D pose of the body of the person 110 based on the acquired color image 412. In an embodiment, to determine the 2D pose of the body, the circuitry 202 may detect locations and orientations of human joints in the acquired color image 412. The detection of the locations and orientations of the human joints may be based on 2D pose detection techniques, such as, but not limited to, OpenPose or DeepCut. The OpenPose technique is a multi-person 2D pose estimation technique that may use a nonparametric representation, such as Part Affinity Fields (PAFs), to learn to associate body parts with individuals in the acquired color image 412. The DeepCut technique may involve a joint subset partition and labeling for a multi-person pose estimation. The DeepCut technique may include a partition and labeling formulation of a set of body-part hypotheses. The partition and labeling formulation may be generated with convolution neural network (CNN)-based part detectors. Further, the partition and labeling formulation may be an instance of an integer linear program (ILP), which may implicitly execute a non-maximum suppression on the set of part candidates. The set of part candidates may be grouped to form configurations of body parts based on respective geometric and appearance constraints. As an example, a 2D pose 416 of the body may be determined from the acquired color image 412.

At 408, a 3D pose may be determined. In an embodiment, the circuitry 202 may be configured to determine the 3D pose of the body based on the determined 2D pose and the 3D human-body prior 204A. In an embodiment, the circuitry 202 may retrieve the 3D human-body prior 204A from the server 104 and store the 3D human-body prior 204A in the memory 204, in case the 3D human-body prior 204A is not already stored in the memory 204. Examples of the 3D human-body prior 204A may include, but are not limited to, a SCAPE model or an SMPL model.

By way of example, and not limitation, to determine the 3D pose, a CNN-based 2D pose estimation technique (e.g., the DeepCut technique) may be used to determine the 2D body joint locations and orientations. Thereafter, the 3D human-body prior 204A, such as, the SMPL model may be fit to the 2D joints. The SMPL model may be fit based on a minimization of an objective function that may penalize an error between projected 3D joints of the SMPL model and determined 2D joints. Since the SMPL model may include correlations associated with human body shape across the population, the circuitry 202 may be able to robustly fit the SMPL model to the information associated with the 2D joint locations and orientations. Based on the fitting of the SMPL model to the 2D joints, the 3D pose of the body may be determined. As an example, a 3D human body pose 418 may be determined based on the 2D pose 416 and the 3D human-body prior 204A.

At 410, a 3D body model 420 may be estimated. In an embodiment, the circuitry 202 may be configured to estimate the 3D body model 420 based on the acquired color image 412. The 3D body model 420 may be estimated by shape-fitting and pose-fitting of the 3D human-body prior 204A to the determined 3D pose and shape parameters of the body.

In an embodiment, the estimation of the 3D body model 420 may be further based on the depth information 414. For example, the 3D human body pose 418 may be directly back projected from the 2D human body pose 416 based on the depth information 414. The 3D human-body prior 204A may directly be then fitted to 3D scan points (derived from the acquired color image 412 and the depth information 414). Based on the fitting of the 3D human body pose 418 to the 3D scan points, the 3D body model 420 may be estimated.

Figure 5:
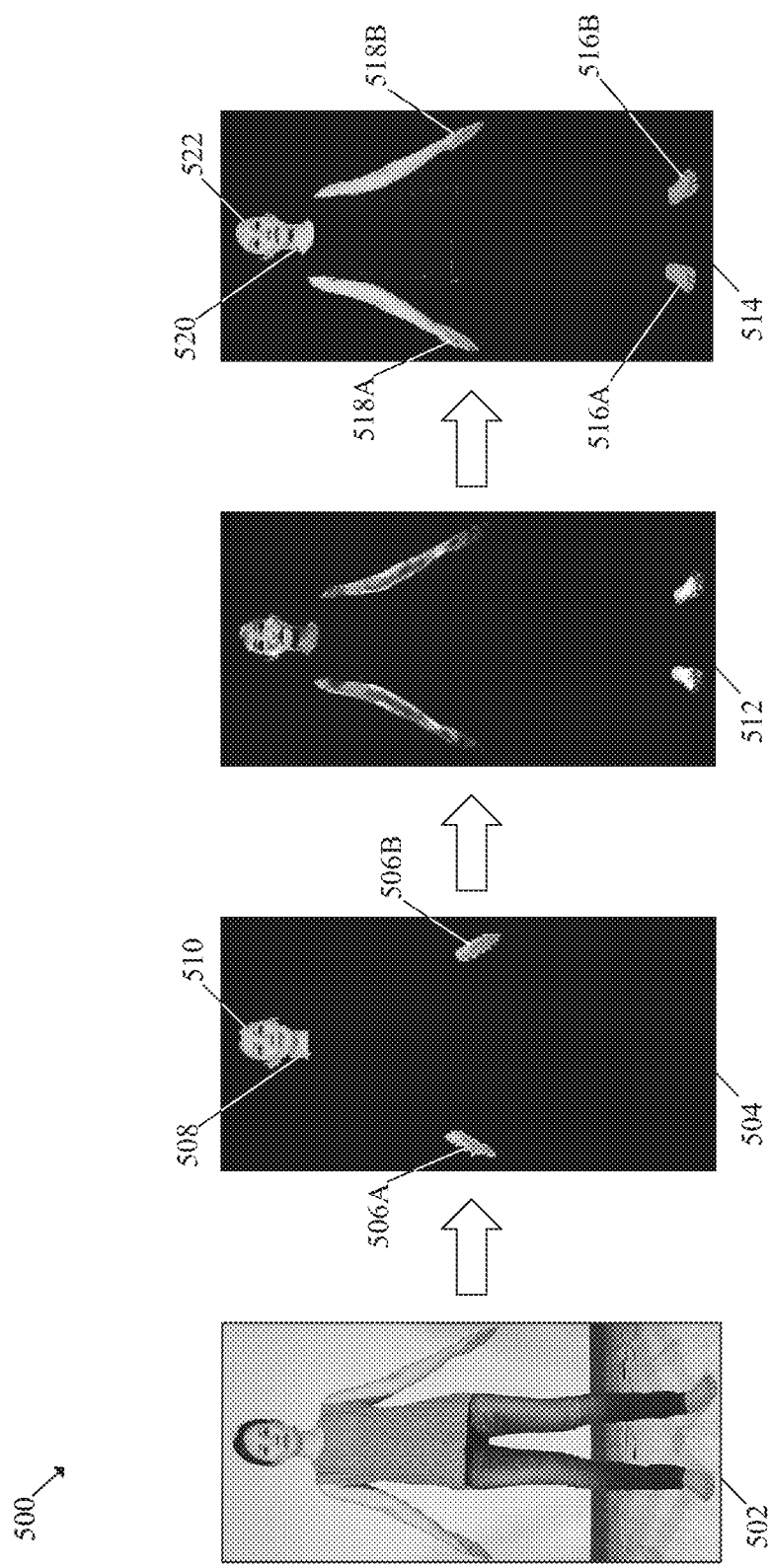
FIG. 5 is a diagram that illustrates an exemplary scenario for human skin detection based on a human body-prior, in accordance with an embodiment of the disclosure.

FIG. 5 is a diagram that illustrates an exemplary scenario for human skin detection based on a human body-prior, in accordance with an embodiment of the disclosure. FIG. 5 is described in conjunction with elements from FIGS. 1, 2, 3, and 4. With reference to FIG. 5, there is shown an exemplary scenario 500. The scenario 500 includes a color image 502, pixel information 504, a probability map 512, and a segmented color image 514.

The color image 502 may be associated with a body of the person 110. The image sensor 106A may be configured to capture the color image 502. The circuitry 202 may acquire the color image 502 from the sensing device 106. The circuitry 202 may estimate a three-dimensional (3D) body model of the person 110 based on the acquired color image 502. The estimation of the 3D body model is described further, for example, in FIGS. 3 and 4. The circuitry 202 may identify one or more unclothed parts of the estimated 3D body model. The identified one or more unclothed parts may correspond to one or more body parts, of which at least a portion of skin may remain uncovered by clothes. The identification of the one or more unclothed parts is described further, for example, in FIG. 3.

The circuitry 202 may extract, from the acquired color image 502, pixel information 504. The pixel information 504 may correspond to the identified one or more unclothed parts. The extraction of the pixel information 504 may be based on the estimated 3D body model. The pixel information 504 may include a first region 506A associated with a first hand portion, a second region 506B associated with a second hand portion 320B, a third region 508 associated with a neck portion, and a fourth region 510 associated with a head portion of the body of the person 110.

The circuitry 202 may determine classification information based on the extracted pixel information 504. The classification information may include a set of values, each of which may indicate a likelihood of whether or not a corresponding pixel of the acquired color image 502 is part of an unclothed skin portion of the person 110. The circuitry 202 may be configured to fit the extracted pixel information 504 to a Gaussian model. Further, the circuitry 202 may estimate a mean and covariance of pixel values included in the extracted pixel information 504, based on the fitting. In an embodiment, the classification information may be a probability map 512, which may be determined based on the estimated mean and covariance. The determination of the probability map 512 is described further, for example, in FIG. 3.

The circuitry 202 may apply a thresholding operation on the determined probability map 512 to generate the segmented color image 514. The unclothed skin portion in the acquired color image 502 may be detected based on the application of the thresholding operation. As shown, for example, the unclothed skin portion in the segmented color image 514 may include a first foot portion 516A, a second foot portion 516B, a first arm-and-hand portion 518A, a second arm-and-hand portion 518B, a neck portion 520, and a head portion 522. The detection of the unclothed skin portion is further described, for example, in FIG. 3.

The detection of unclothed skin portion based on human-body prior may be more accurate when compared to conventional methods, such as, techniques that may involve a use of a prior knowledge of human skin colors. This may be because the disclosed technique may use the body prior for skin portion detection and as a result may not be affected by large variation of human skin colors, as in the case of conventional methods. Further, the detection of unclothed skin portion based on identification of human body parts may be less prone to false detections, such as a false detection of objects which may match or be close to a skin color.

Figure 6:
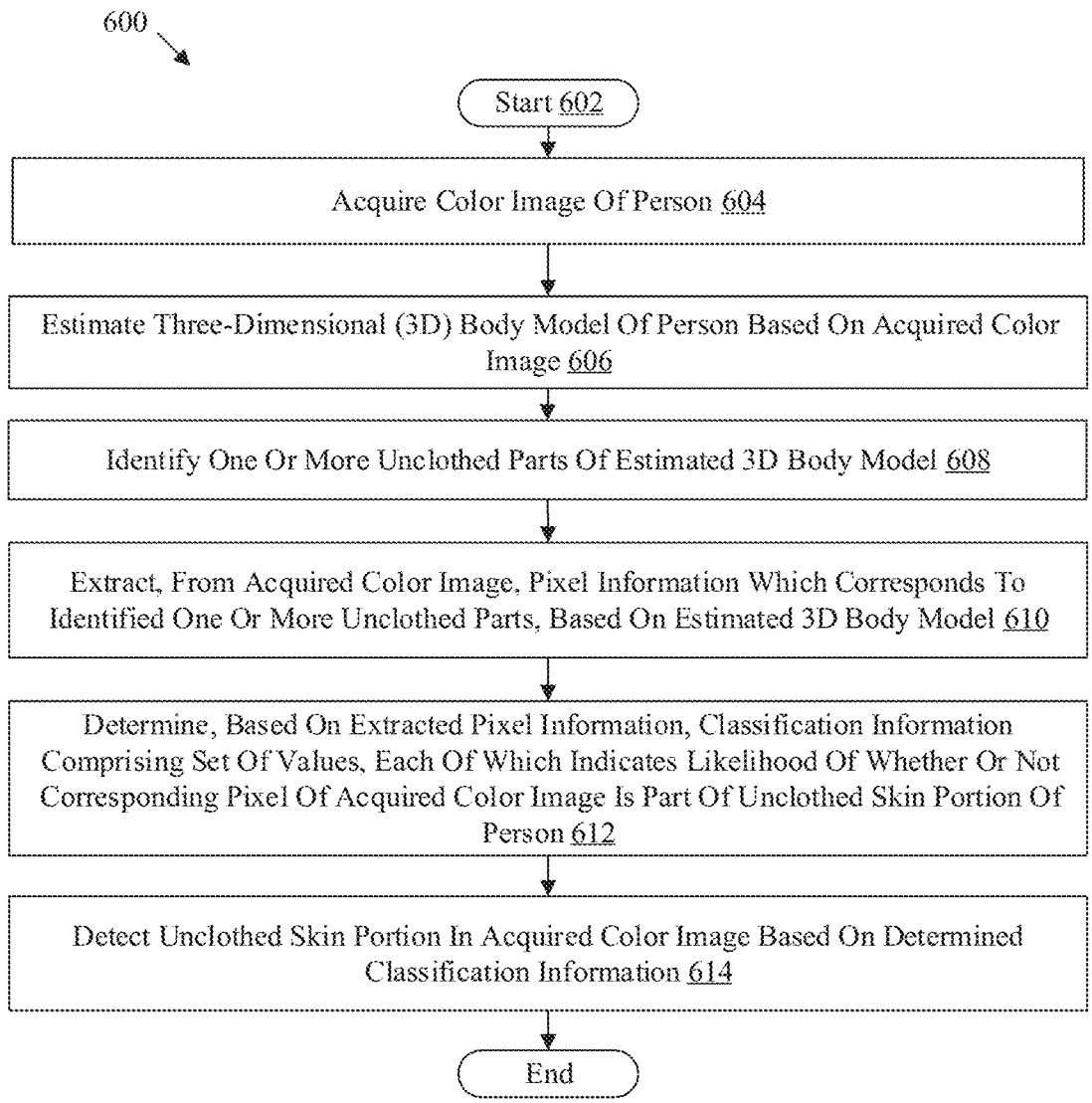
FIG. 6 is a flowchart that illustrates exemplary operations for human skin detection based on a human body-prior, in accordance with an embodiment of the disclosure.

FIG. 6 is a flowchart that illustrates exemplary operations for human skin detection based on a human-body prior, in accordance with an embodiment of the disclosure. FIG. 6 is described in conjunction with elements from FIGS. 1, 2, 3, 4, and 5. With reference to FIG. 6, there is shown a flowchart 600. The flowchart 600 may include operations 604 to 616 may be implemented in the electronic device 102. The flowchart 600 may start at 602 and proceed to 604.

At 604, the color image (e.g., the color image 314) of the person 110 may be acquired. In an embodiment, the circuitry 202 of the electronic device 102 may be configured to acquire the color image 314 of the person 110. In an embodiment, the image sensor 106A of the sensing device 106 may capture the color image 314 of the person 110. The sensing device 106 may transmit the captured color image 314 to the circuitry 202, via the communication network 108.

At 606, the three-dimensional (3D) body model (e.g., the 3D body model 316) of the person 110 may be estimated based on the acquired color image 314. In an embodiment, the circuitry 202 may be configured to estimate the 3D body model 316 of the person 110 based on the acquired color image 314. In the embodiment, the circuitry 202 may be configured to determine a two-dimensional (2D) pose of the body of the person 110 based on the acquired color image 314. Further, the circuitry 202 may be configured to determine a 3D pose of the body based on the determined 2D pose and the 3D human-body prior 204A. In an embodiment, the 3D body model 316 may be estimated based on the determined 3D pose and the 3D human-body prior 204A. The estimation of the 3D model is described further, for example, in FIG. 4.

At 608, the one or more unclothed parts of the estimated 3D body model 316 may be identified. In an embodiment, the circuitry 202 may be configured to identify the one or more unclothed parts of the estimated 3D body model 316. The identified one or more unclothed parts may correspond to one or more body parts, of which at least a portion of skin may remain uncovered by clothes.

In an embodiment, the circuitry 202 may be configured to receive a user input from a user associated with the electronic device 102. The one or more unclothed parts may be identified based on the received user input. For example, the one or more unclothed parts may be labelled on the estimated 3D body model 316 based on the received user input.

In an embodiment, the identification may include an assignment of an identifier to each of the one or more unclothed parts. For example, the 3D human-body prior 204A may correspond to one of, but not limited to, a Shape Completion and Animation of People (SCAPE) model or a Skinned Multi-Person Linear (SMPL) model. The 3D human-body prior 204A may include a set of identifiers associated with one or more parts of a human body. The circuitry 202 may assign an identifier to each of the one or more unclothed parts based on corresponding identifiers from the set of identifiers associated with the 3D human-body prior 204A. In an example, the identified one or more unclothed parts may include one or more of, but not limited to, a face portion, a head portion, a neck portion, a hand portion, or a leg portion. As an example, the labelled 3D body model 318 may include the 3D body model 316 and the identified one or more unclothed parts associated with the 3D body model 316. The one or more unclothed parts in the labelled 3D body model 318 may include the first hand portion 320A, the second hand portion 320B, the neck portion 322, and the head portion 324. The identification of the one or more unclothed parts is described further, for example, in FIG. 3.

At 610, from the acquired color image 314, pixel information which may correspond to the identified one or more unclothed parts may be extracted based on the estimated 3D body model 316. In an embodiment, the circuitry 202 may be configured to extract the pixel information (e.g., the pixel information 326) from the acquired color image 314. The pixel information 326 may correspond to the identified one or more unclothed parts (e.g., the first hand portion 320A, the second hand portion 320B, the neck portion 322, and the head portion 324). The extraction of the pixel information 326 may be based on the estimated 3D body model (e.g., the 3D body model 316). The pixel information 326 may include a first region 328A associated with the first hand portion 320A, a second region 328B associated with the second hand portion 320B, a third region 330 associated with the neck portion 322, and a fourth region 332 associated with the head portion 324. The extraction of the pixel information is described further, for example, in FIG. 3.

At 612, based on the extracted pixel information 326, the classification information may be determined. Herein, the classification information may include a set of values, each of which may indicate a likelihood of whether or not a corresponding pixel of the acquired color image may be a part of an unclothed skin portion of the person 110. In an embodiment, the circuitry 202 may be configured to determine the classification information based on the extracted pixel information 326. In an embodiment, the circuitry 202 may be configured to fit the extracted pixel information to a Gaussian model. Further, the circuitry 202 may be configured to estimate a mean and a covariance of pixel values that may be included in the extracted pixel information, based on the fitting. In an embodiment, the circuitry 202 may determine a probability map based on the estimation of the mean and the covariance. The classification information may be the probability map. The determination of the classification information is described further, for example, in FIG. 3. An example of the probability map is provided, for example, in FIG. 5.

At 614, the unclothed skin portion may be detected in the acquired color image 314 based on the determined classification information. In an embodiment, the circuitry 202 may be configured to detect the unclothed skin portion in the acquired color image 314 based on the determined classification information. In an embodiment, the circuitry 202 may be configured to apply a thresholding operation of the determined probability map (as determined at 310). The unclothed skin portion in the acquired color image 314 may be detected based on the application of the thresholding operation. For example, based on the probability map (i.e., the classification information), if the probability value of a pixel is above the thresholding value, the pixel may be segmented into the unclothed skin portion in the acquired color image 314. As an example, the segmented color image 334 including the detected unclothed skin portions may be determined from the acquired color image 314 based on the thresholding operation. The segmented color image 334 may include the first foot portion 336A, the second foot portion 336B, the first arm-and-hand portion 338A, the second arm-and-hand portion 338B, the neck portion 340, and the head portion 342 as the detected unclothed skin portions of the acquired color image 314. Control may pass to the end.

Although the flowchart 600 is illustrated as discrete operations, such as 602, 604, 606, 608, 610, 612, and 614, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic device (for example, the electronic device 102). The instructions may cause the electronic device 102 to perform operations that include acquiring a color image (e.g., the color image 314) of a person (e.g., the person 110). The operations may further include estimating a 3D body model (e.g., the 3D body model 316) of the person 110 based on the acquired color image 314. The operations may further include identifying one or more unclothed parts of the estimated 3D body model 316. The identified one or more unclothed parts may correspond to one or more body parts, of which at least a portion of skin may remain uncovered by clothes. The operations may further include extracting, from the acquired color image 314, pixel information (e.g., the pixel information 326) which may correspond to the identified one or more unclothed parts, based on the estimated 3D body model 316. The operations may further include determining, based on the extracted pixel information 326, classification information including a set of values, each of which may indicate a likelihood of whether or not a corresponding pixel of the acquired color image 314 may be a part of an unclothed skin portion of the person 110. The operations may further include detecting the unclothed skin portion in the acquired color image 314 based on the determined classification information.

Exemplary aspects of the disclosure may provide an electronic device (such as, the electronic device 102 of FIG. 1) that includes circuitry (such as, the circuitry 202). The circuitry 202 may be configured acquire a color image (e.g., the color image 314) of a person (e.g., the person 110). The circuitry 202 may be further configured to estimate a 3D body model (e.g., the 3D body model 316) of the person 110 based on the acquired color image 314. The circuitry 202 may be further configured to identify one or more unclothed parts of the estimated 3D body model 316. The identified one or more unclothed parts may correspond to one or more body parts, of which at least a portion of skin may remain uncovered by clothes. The circuitry 202 may be further configured to extract, from the acquired color image 314, pixel information (e.g., the pixel information 326) which may correspond to the identified one or more unclothed parts, based on the estimated 3D body model 316. The circuitry 202 may be further configured to determine, based on the extracted pixel information 326, classification information including a set of values, each of which may indicate a likelihood of whether or not a corresponding pixel of the acquired color image 314 may be a part of an unclothed skin portion of the person 110. The circuitry 202 may be further configured to detect the unclothed skin portion in the acquired color image 314 based on the determined classification information.

In an embodiment, the circuitry 202 may be further configured to acquire depth information (e.g., the depth information 414) associated with body of the person 110. The estimation of the 3D body model 316 may be further based on the acquired depth information 414.

In an embodiment, the circuitry 202 may be further configured to determine a 2D pose of the body of the person 110 based on the acquired color image 314. The circuitry 202 may be further configured to determine a 3D pose of the body based on the determined 2D pose and a 3D human-body prior (e.g., the 3D human-body prior 204A). The 3D body model 316 may be estimated based on the determined 3D pose and the 3D human-body prior 204A.

In an embodiment, the circuitry 202 may be further configured to receive a user input. The one or more unclothed parts may be identified based on the received user input. In an embodiment, the identification may include an assignment of an identifier to each of the one or more unclothed parts. Examples of the identified one or more unclothed parts may include one or more of, but not limited to, a face portion, a head portion, a neck portion, a hand portion, or a leg portion of the body.

In an embodiment, the circuitry 202 may be further configured to project the estimated 3D body model 316 onto a 2D image plane. The circuitry 202 may be further configured to extract the pixel information 326 based on a correspondence between points belonging to the identified one or more unclothed parts in the projection of the 3D body model 316 and corresponding pixels of the acquired color image 314.

In an embodiment, the circuitry 202 may be configured to determine a first part of the estimated 3D body model 316 which may be clothed. The determination of the first part may be based on a color distribution of pixels which may be included in the acquired color image 314 and may correspond to the first part of the estimated 3D body model 316. The circuitry 202 may be configured to identify the one or more unclothed parts further based on the determination of the first part.

In an embodiment, the circuitry 202 may be further configured to fit the extracted pixel information 326 to a Gaussian model. The circuitry 202 may be further configured to estimate a mean and covariance of pixel values included in the extracted pixel information 326, based on the fitting. In an embodiment, the classification information may be a probability map (e.g., the probability map 512) which may be determined based on the estimated mean and covariance. The circuitry may be further configured to apply a thresholding operation on the determined probability map (e.g., the probability map 512). The unclothed skin portion in the acquired color image 314 may be detected based on the application of the thresholding operation.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
    circuitry configured to:
        acquire a color image of a person;
        estimate a three-dimensional (3D) body model of the person based on the acquired color image;
        identify one or more unclothed parts of the estimated 3D body model, wherein
            the identified one or more unclothed parts correspond to one or more body parts, of which at least a portion of skin remains uncovered by clothes,
            the identification includes an assignment of an identifier to each of the one or more unclothed parts of the estimated 3D body model, and
            the assignment of the identifier is based on a selection of a corresponding identifier from a set of identifiers associated with a 3D human-body prior;
        extract, from the acquired color image, pixel information which corresponds to the identified one or more unclothed parts;
        determine, based on the extracted pixel information, classification information comprising a set of values, each of which indicates a likelihood of whether or not a corresponding pixel of the acquired color image is part of an unclothed skin portion of the person; and
        detect the unclothed skin portion in the acquired color image based on the determined classification information.

2. The electronic device according to claim 1, wherein
    the circuitry is further configured to acquire depth information associated with a body of the person, and
    the estimation of the 3D body model is further based on the acquired depth information.

3. The electronic device according to claim 1, wherein the circuitry is further configured to:
    determine a two-dimensional (2D) pose of a body of the person based on the acquired color image; and
    determine a 3D pose of the body based on the determined 2D pose and the 3D human-body prior, wherein
        the 3D body model is estimated based on the determined 3D pose and the 3D human-body prior.

4. The electronic device according to claim 1, wherein
    the circuitry is further configured to receive a user input, and
    the one or more unclothed parts are identified based on the received user input.

5. The electronic device according to claim 1, wherein the identified one or more unclothed parts comprises one or more of a face portion, a head portion, a neck portion, a hand portion, or a leg portion.

6. The electronic device according to claim 1, wherein the circuitry is further configured to:
    project the estimated 3D body model onto a 2D image plane; and
    extract the pixel information based on a correspondence between points belonging to the identified one or more unclothed parts in the projection of the 3D body model and corresponding pixels of the acquired color image.

7. The electronic device according to claim 1, wherein the circuitry is further configured to:
    determine a first part of the estimated 3D body model based on a color distribution of pixels which are included in the acquired color image and correspond to the first part of the estimated 3D body model, wherein the first part is clothed; and
    identify the one or more unclothed parts further based on the determination of the first part.

8. The electronic device according to claim 1, wherein the circuitry is further configured to:
    fit the extracted pixel information to a Gaussian model; and
    estimate a mean and covariance of pixel values included in the extracted pixel information, based on the fitting.

9. The electronic device according to claim 8, wherein the classification information is a probability map which is determined based on the estimated mean and covariance.

10. The electronic device according to claim 9, wherein
    the circuitry is further configured to apply a thresholding operation on the probability map, and
    the unclothed skin portion in the acquired color image is detected based on the application of the thresholding operation.

11. A method, comprising:
    in an electronic device:
        acquiring a color image of a person;
        estimating a three-dimensional (3D) body model of the person based on the acquired color image;
        identifying one or more unclothed parts of the estimated 3D body model, wherein the identified one or more unclothed parts correspond to one or more body parts, of which at least a portion of skin remains uncovered by clothes, the identification includes an assignment of an identifier to each of the one or more unclothed parts of the estimated 3D body model, and the assignment of the identifier is based on a selection of a corresponding identifier from a set of identifiers associated with a 3D human-body prior;

extracting, from the acquired color image, pixel information which corresponds to the identified one or more unclothed parts;

determining, based on the extracted pixel information, classification information comprising a set of values, each of which indicates a likelihood of whether or not a corresponding pixel of the acquired color image is part of an unclothed skin portion of the person; and detecting the unclothed skin portion in the acquired color image based on the determined classification information.

12. The method according to claim 11, further comprising:
determining a two-dimensional (2D) pose of a body of the person based on the acquired color image; and
determining a 3D pose of the body based on the determined 2D pose and the 3D human-body prior, wherein the 3D body model is estimated based on the determined 3D pose and the 3D human-body prior.

13. The method according to claim 11, further comprising receiving a user input, wherein the one or more unclothed parts are identified based on the received user input.

14. The method according to claim 11, further comprising:
projecting the estimated 3D body model onto a 2D image plane; and
extracting the pixel information based on a correspondence between points belonging to the identified one or more unclothed parts in the projection of the 3D body model and corresponding pixels of the acquired color image.

15. The method according to claim 11, further comprising:
determining a first part of the estimated 3D body model based on a color distribution of pixels which are included in the acquired color image and correspond to the first part of the estimated 3D body model, wherein the first part is clothed; and
identifying the one or more unclothed parts further based on the determination of the first part.

16. The method according to claim 11, further comprising:
fitting the extracted pixel information to a Gaussian model; and
estimating a mean and covariance of pixel values included in the extracted pixel information, based on the fitting, wherein the classification information is a probability map which is determined based on the estimated mean and covariance.

17. The method according to claim 16, further comprising applying a thresholding operation on the probability map, wherein the unclothed skin portion in the acquired color image is detected based on the application of the thresholding operation.

18. A non-transitory computer-readable medium having stored thereon, computer-executable instructions that when executed by an electronic device, causes the electronic device to execute operations, the operations comprising:
acquiring a color image of a person;
estimating a three-dimensional (3D) body model of the person based on the acquired color image;
identifying one or more unclothed parts of the estimated 3D body model, wherein
the identified one or more unclothed parts correspond to one or more body parts, of which at least a portion of skin remains uncovered by clothes,
the identification includes an assignment of an identifier to each of the one or more unclothed parts of the estimated 3D body model, and
the assignment of the identifier is based on a selection of a corresponding identifier from a set of identifiers associated with a 3D human-body prior;
extracting, from the acquired color image, pixel information which corresponds to the identified one or more unclothed parts;
determining, based on the extracted pixel information, classification information comprising a set of values, each of which indicates a likelihood of whether or not a corresponding pixel of the acquired color image is part of an unclothed skin portion of the person; and
detecting the unclothed skin portion in the acquired color image based on the determined classification information.

19. An electronic device, comprising:
circuitry configured to:
acquire a color image of a person;
determine a two-dimensional (2D) pose of a body of the person based on the acquired color image;
determine a 3D pose of the body based on the determined 2D pose and a 3D human-body prior;
estimate a three-dimensional (3D) body model of the person based on the determined 3D pose and the 3D human-body prior;
identify one or more unclothed parts of the estimated 3D body model, wherein the identified one or more unclothed parts correspond to one or more body parts, of which at least a portion of skin remains uncovered by clothes;
extract, from the acquired color image, pixel information which corresponds to the identified one or more unclothed parts;
determine, based on the extracted pixel information, classification information comprising a set of values, each of which indicates a likelihood of whether or not a corresponding pixel of the acquired color image is part of an unclothed skin portion of the person; and
detect the unclothed skin portion in the acquired color image based on the determined classification information.

* * * * *